(12) United States Patent
Waibel et al.

(10) Patent No.: US 6,324,510 B1
(45) Date of Patent: Nov. 27, 2001

(54) METHOD AND APPARATUS OF HIERARCHICALLY ORGANIZING AN ACOUSTIC MODEL FOR SPEECH RECOGNITION AND ADAPTATION OF THE MODEL TO UNSEEN DOMAINS

(75) Inventors: Alex Waibel, Pittsburgh, PA (US); Juergen Fritsch, Karlsruhe (DE)

(73) Assignee: Lernout & Hauspie Speech Products N.V. (BE)

( * ) Notice: Subject to any disclaimer, the term of this patent is extended or adjusted under 35 U.S.C. 154(b) by 0 days.

(21) Appl. No.: 09/187,902

(22) Filed: Nov. 6, 1998

(51) Int. Cl.$^7$ .................................................. G10L 15/14
(52) U.S. Cl. .................... 704/256; 704/254; 704/242; 704/232
(58) Field of Search ................... 704/254, 259, 704/245, 242, 232, 256

(56) References Cited

U.S. PATENT DOCUMENTS

| | | | |
|---|---|---|---|
| 4,803,729 | * | 2/1989 | Baker ..................................... 704/254 |
| 5,303,299 | * | 4/1994 | Hunt et al. ......................... 379/88.01 |
| 5,345,535 | * | 9/1994 | Doddington .......................... 704/236 |
| 5,715,367 | * | 2/1998 | Gillick et al. ........................ 704/254 |
| 5,745,649 | * | 4/1998 | Lubensky ............................. 704/232 |
| 5,799,277 | * | 8/1998 | Takami ................................. 704/256 |
| 5,806,030 | * | 9/1998 | Junqua ................................. 704/245 |
| 5,983,180 | * | 11/1999 | Robinson ............................. 704/254 |
| 6,067,517 | * | 5/2000 | Bahl et al. ............................ 704/256 |

OTHER PUBLICATIONS

Jurgen Fritsch, Michael Finke, "Acid/HNN: Clustering Hierarchies of Neural Networks for Context—Dependent Connectionist Acoustic Modeling," IEEE International conference on Acoustics, Speech and Signal Processing, Conference 23 (New York, New York), p. 505–508, (1998).

J. Fritsch, M. Finke, A. Waibel, "Effective Structural Adaptation of LVCSR Systems to Unsen domains using hierarchical connectionist acoustic models," Proceedings of the International Conference on Spoken Language Processing, p. 2919–2922, (Nov. 30–Dec. 4, 1998).

(List continued on next page.)

*Primary Examiner*—Richemond Dorvil
*Assistant Examiner*—Daniel Abebe
(74) *Attorney, Agent, or Firm*—Bromberg & Sunstein

(57) ABSTRACT

A method of organizing an acoustic model for speech recognition is comprised of the steps of calculating a measure of acoustic dissimilarity of subphonetic units. A clustering technique is recursively applied to the subphonetic units based on the calculated measure of acoustic dissimilarity to automatically generate a hierarchically arranged model. Each application of the clustering technique produces another level of the hierarchy with the levels progressing from the least specific to the most specific. A technique for adapting the structure and size of a trained acoustic model to an unseen domain using only a small amount of adaptation data is also disclosed.

36 Claims, 4 Drawing Sheets

OTHER PUBLICATIONS

Paul, D.B., "Extensions to Phone–State Decision–Tree Clustering: Single Tree and Tagged Clustering," IEEE Comp. Soc. Press, IEEE International Conference on Acoustic, Speech, and Signal Processing (Los Alamitos, US), p. 1487–1490, ( 1997).

H. Franco, "Context–Dependent Connectionist Probability Estimation in a Hybrid Markov Model–Neural Net Speech Recognition System," Computer Speech and Language, vol. 8 (No. 3), (Feb. 22, 1994).

J Fritsch, et al., "Context–Dependent Hybrid HME/HMM Speech Recognition Using Polyphone Clustering Decision Trees," Proc. of ICASSP '97.

D.J. Kershaw, et al., "Context–Dependent Classes in a Hybrid Recurrent Network HMM Speech Recognition System," Tech. Rep. CUED/F–INFENG/TR217, CUED, Cambridge England 1995.

D.L. Thomson, "Ten Case Studies of the Effect of Field Conditions on Speech Recognition Errors," Proceedings of the IEEE ASRU Workshop, (Feb. 22, 1997).

J. Schurmann and W. Doster, "A Decision Theoretic Approach to Hierarchical Classifier Design," Pattern Recognition 17(3), (Feb. 22, 1994).

J. Fritsch, "Acid/HNN; A Framework for Hierarchical Connectionist Acoustic Modeling," Proceedsing of IEEE ASRU Workshop, (Feb. 22, 1997).

C.J. Leggetter and P.C. Woodland, "Speaker Adaptation of HMMs using Linear Regression," Tech. Rep. CUED/F–INFENG/TR181, CUED, (Feb. 22, 1994).

Franco, H., "Context–Dependent Connectionist Probability Estimation in a Hybrid Markov Model–Neural Net Speech Recognition System", *Computer Speech and Language,* vol. 8, No. 3, Jul. 1994.

Fritsch, J., et al, "Context–Dependent Hybrid MHE/HMM Speech Recognition Using Polyphone Clustering Decision Trees", *Proc. Of ICASS '97,* Apr. 21–24, 1997.

Kershaw, D. J., et al, "Contest–Dependent Classes in a Hybrid Recurrent Network HMM Speech Recognition System", *Tech. Rep CUED/F–INFENG/TR217, CUED,* Cambridge, England, Jul. 1995.

Thomson, D. L., "Ten Case Studies of the Effect of Field Conditions on Speech Recognition Errors", *Proceedings of the IEEE ASRU Workshop,* Dec. 17, 1997.

Schurmann, J., et al. "A Decision Theoretic Approach to Hierarchical Classifier Design", *Pattern Recognition,* 17 (3), 1984.

Fritsch., J., "ACIDHNN; A Framework for Hierarchical Connectionist Acoustic Modeling", *Proceedings of IEEE ASRU Workshop,* Dec. 14–17, 1997.

Leggetter, C.J., et al, "Speaker Adaptation of HMM's Using Linear Regression", *Tech. Rep. CUED/F–INFENG/TR181, CUED,* Jun. 1994.

* cited by examiner

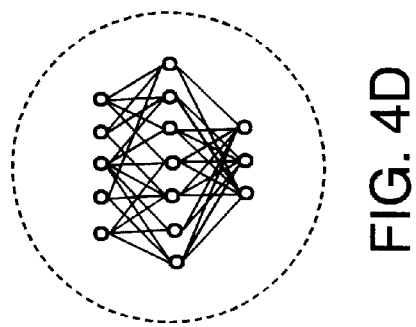
FIG. 4D
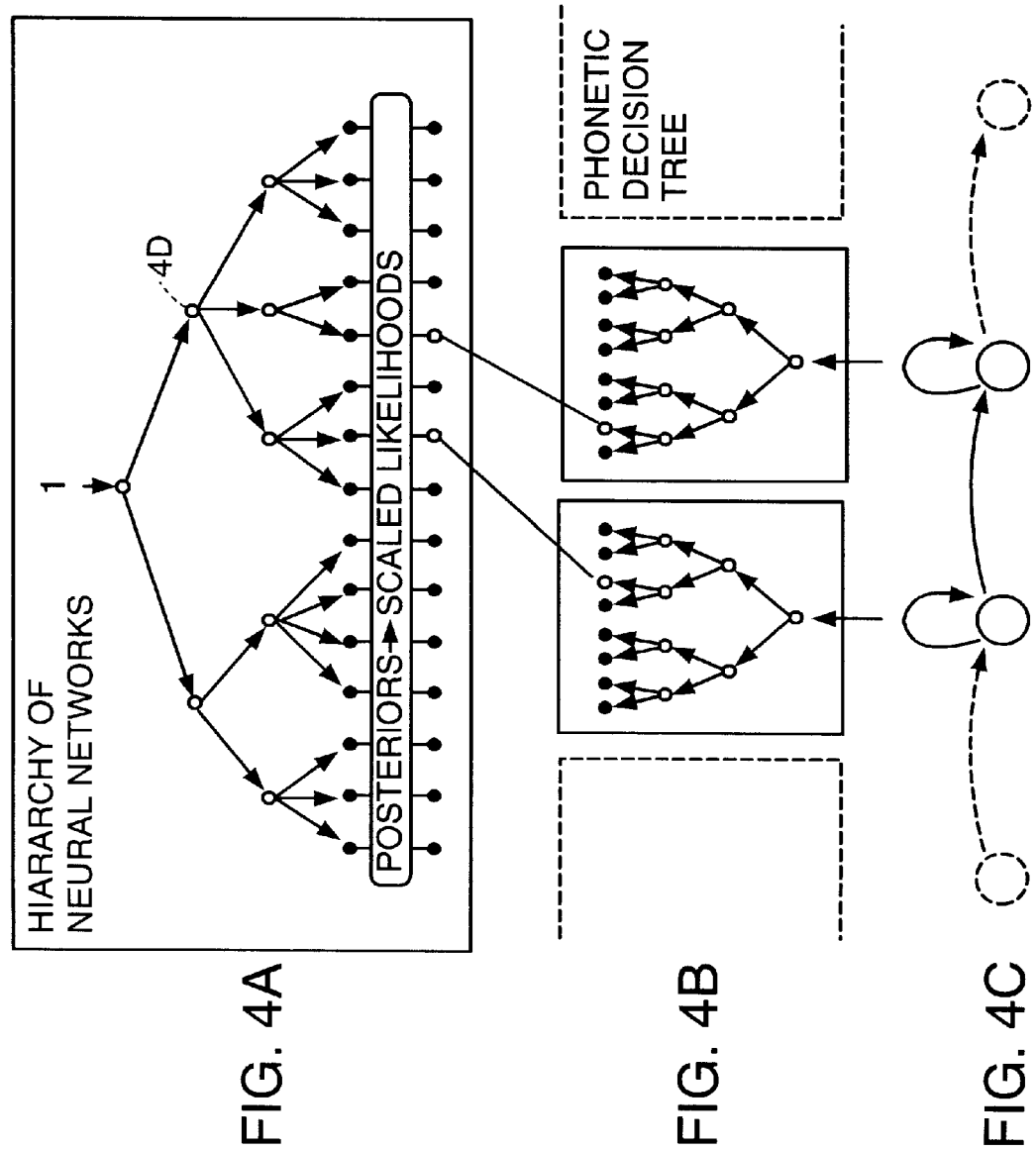
FIG. 4A
FIG. 4B
FIG. 4C

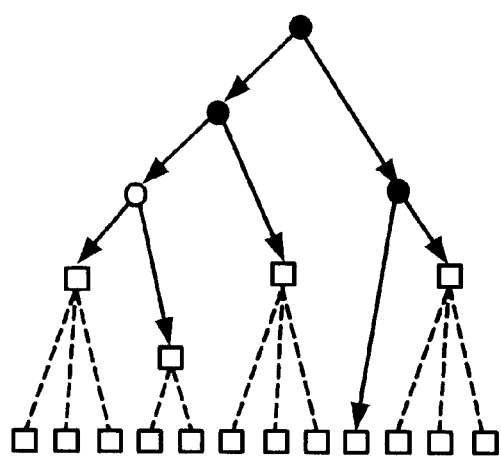
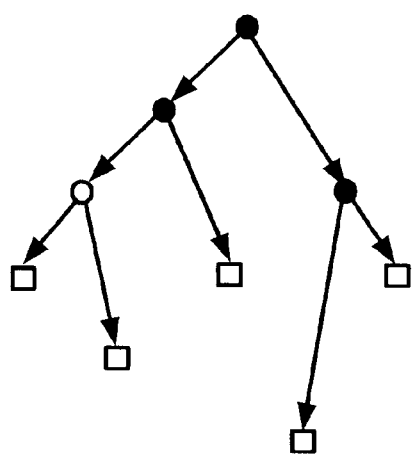
FIG. 5A                    FIG. 5B
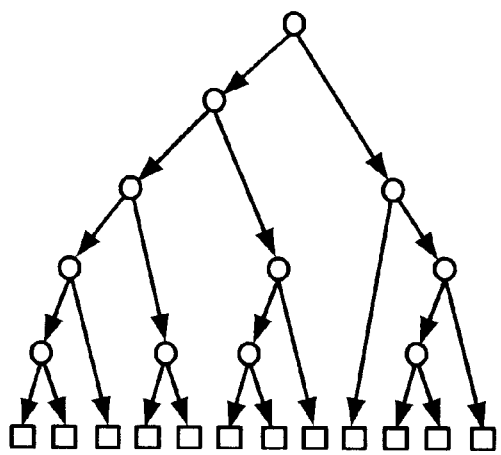
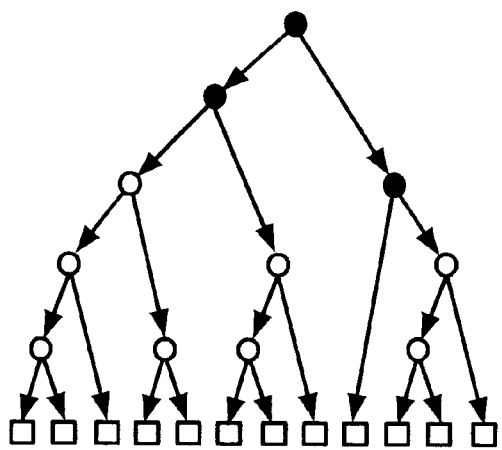
FIG. 5C                    FIG. 5D

US 6,324,510 B1

METHOD AND APPARATUS OF HIERARCHICALLY ORGANIZING AN ACOUSTIC MODEL FOR SPEECH RECOGNITION AND ADAPTATION OF THE MODEL TO UNSEEN DOMAINS

BACKGROUND OF THE INVENTION

1. Field of the Invention

The present invention is directed generally to speech recognition systems and, more particularly, to speech recognition systems utilizing hierarchical connectionist acoustic models.

2. Description of the Background

Statistical speech recognition based on hidden Markov models (HMM) currently is the dominating paradigm in the research community even though several limitations of that technique are repeatedly being discussed. Connectionist acoustic models have proven to be able to overcome some of the drawbacks of HMMs. H. Bourlard et al., "Connectionist Speech Recognition—A Hybrid Approach", Kluwer Academic Press, 1994. In particular, connectionist acoustic models were shown to outperform traditional mixtures of Gaussians based acoustic models on small, controlled tasks using context-independent HMMs.

However, wide-spread use of connectionist acoustic models is hindered by at least two issues: (1) training of connectionist acoustic models is much slower, leading to training times of several days, if not weeks, and (2) poor scalability of connectionist acoustic models to larger systems. Refinement of traditional mixtures of Gaussians based acoustic modeling using phonetic decision trees for polyphonic context modeling has led to systems consisting of thousands of HMM states. Significant gains in recognition accuracy have been observed in such systems. Nevertheless, research in context-dependent connectionist acoustic models has long concentrated on comparably small systems because it was not clear how to reliably estimate posterior probabilities for thousands of states. Application of a single artificial neural network as in context-independent modeling leads to an unfeasibly large number of output nodes. Factoring posteriors based on context, monophone or HMM state identity was shown to be capable of breaking down the global estimation problem into subproblems of small enough size to allow the application of multiple artificial neural networks. H. Franco, "Context-dependent connectionist probability estimation in a hybrid Hidden Markov Model—Neural Net speech recognition system", *Computer Speech and Language*, Vol. 8, No. 3, 1994; J. Fritsch, et al., "Context-Dependent Hybrid HME/HMM Speech Recognition using Polyphone Clustering Decision Trees", *Proc. Of ICASSP '97*, Munich 1997; D. J. Kershaw, et al, "Context-Dependent Classes in a Hybrid Recurrent Network HMM Speech Recognition System", *Tech. Rep. CUED/F-INFENG/TR217*, CUED, Cambridge, England 1995.

Comparable gains in performance were achieved with context-dependent connectionist acoustic models based on that technique. However, factoring posteriors in terms of monophone and context identity seems to be limited to medium size systems. In large systems, non-uniform distribution of the number of context classes again leads to unfeasibly large numbers of output nodes for some of the context networks.

Another problem with current HMM-based speech recognition technology is that it suffers from domain dependence. Over the years, the community has validated and commercialized the technology based on standardized training and test sets in restricted domains, such as the Wall Street Journal (WSJ) (business newspaper texts), Switchboard (SWB) (spontaneous telephone conversations) and Broadcast News (BN) (radio/tv news shows). Performance of systems trained on such domains typically drops significantly when applied to a different domain, especially with changing speaking style, e.g. when moving from read speech to spontaneous speech. D. L. Thomson, "Ten Case Studies of the Effect of Field Conditions on Speech Recognition Errors", *Proceedings of the IEEE ASRU Workshop*, Santa Barbara, 1997. For instance, performance of a recognizer trained on WSJ typically decreases severely when decoding SWB data. Several factors can be held responsible for the strong domain dependence of current statistical speech recognition systems. One is constrained quality, type or recording conditions of domain specific speech data (read, conversational, spontaneous speech/noisy, clean recordings/presence of acoustic background sources, etc.). Another is vocabulary and language model dependence of phonetic context modeling based on phonetic decision trees. That implies a strong dependence of allophonic models on the specific domain. Another factor is domain dependent optimization of size of acoustic model based on amount of available training data and/or size of vocabulary. While the first of the above-mentioned factors is typically addressed by some sort of speaker and/or environment adaptation technique, the latter two factors are usually not adequately addressed in cross-domain applications.

Consider the scenario of porting a trained recognizer to a different domain within the same language. Usually, a phonetic dictionary for the new domain based on the set of phones modeled by the recognizer can be constructed relatively easily using a large background dictionary and, if necessary, applying a set of phone mapping rules. Also, we consider it justifiable to assume that enough text data is available, such that we can train a statistical language model for the new domain. What typically makes porting efforts expensive and time consuming is the adaptation of the acoustic model. The most common approach of applying supervised acoustic adaptation techniques requires large amounts of transcribed speech data from the new domain to capture the differing statistics reasonably well.

Thus, the need exists for an acoustic model which exhibits full scalability, avoids stability problems due to non-uniform prior distributions and is easily integrated into existing large vocabulary conversational speech recognition (LVCSR) systems. The need also exists for a trained acoustic model to be easily adapted in structure and size to unseen domains using only small amounts of adaptation data.

SUMMARY OF THE INVENTION

The present invention is directed to a method of organizing an acoustic model for speech recognition comprised of the steps of calculating a measure of acoustic dissimilarity of subphonetic units. Recursively clustering the subphonetic units based on the calculated measure automatically generates a hierarchically arranged model. An apparatus for performing the method is also disclosed.

Starting from an initial set of decision tree clustered, context-dependent, subphonetic units, the present invention uses an aglommerative clustering algorithm across monophones to automatically design a tree-structured decomposition of posterior probabilities which is instantiated with thousands of small neural network estimators at each of the nodes of the tree.

The present invention is also directed to a method of structurally adapting a hierarchical acoustic model having both nodes and leaves to a new domain. The method is comprised of the steps of identifying nodes that receive more than a predetermined amount of adaptation data and adapting the local estimators of conditional posteriors and priors of the identified nodes using data from the new domain. A user-specified quantity of the non-identified nodes are removed and leaves are created, where needed, to replace the removed nodes. All of the HMM states are related to the new leaves such that they share a single model represented by the new leaves.

The disclosed method allows effective adaptation of the structure and size of a trained acoustic model to an unseen domain using only a small amount of adaptation data. The present invention benefits from the multi-level, hierarchical representation of the context-dependent acoustic model. In contrast to approaches based on acoustic adaptation only, the present invention uses an estimate of the a-priori distribution of modeled HMM states on the new domain to dynamically downsize or prune the tree-structured acoustic model. In that manner, the present invention accounts for differences in vocabulary size and adjusts to the specificity of phonetic context observed in the new domain.

By adapting the specificity of the acoustic model, improved performance can be obtained with very little requirements for adaptation data. Furthermore, the present invention compensates over fitting effects particularly when targeting a domain with a much smaller vocabulary. The present invention may also be applied to downsize/prune an acoustic model to any desired size to accommodate computing and/or memory resource limitations. Those, and other advantages and benefits of the present invention, will become apparent from reading the Description Of The Preferred Embodiment hereinbelow.

BRIEF DESCRIPTION OF THE DRAWINGS

For the present invention to be easily understood and readily practiced, the present invention will now be described for purposes of illustration and not limitation in connection with the following figures wherein:

FIGS. 4A, 4B, 4C and 4D illustrate the integration of the present invention's hierarchical neural network architecture into a large vocabulary conversational speech recognition system; and FIGS. 5A, 5B, 5C and 5D illustrate the steps in adapting a baseline tree structure to a new, smaller domain.

DESCRIPTION OF PREFERRED EMBODIMENT

Figure 1:
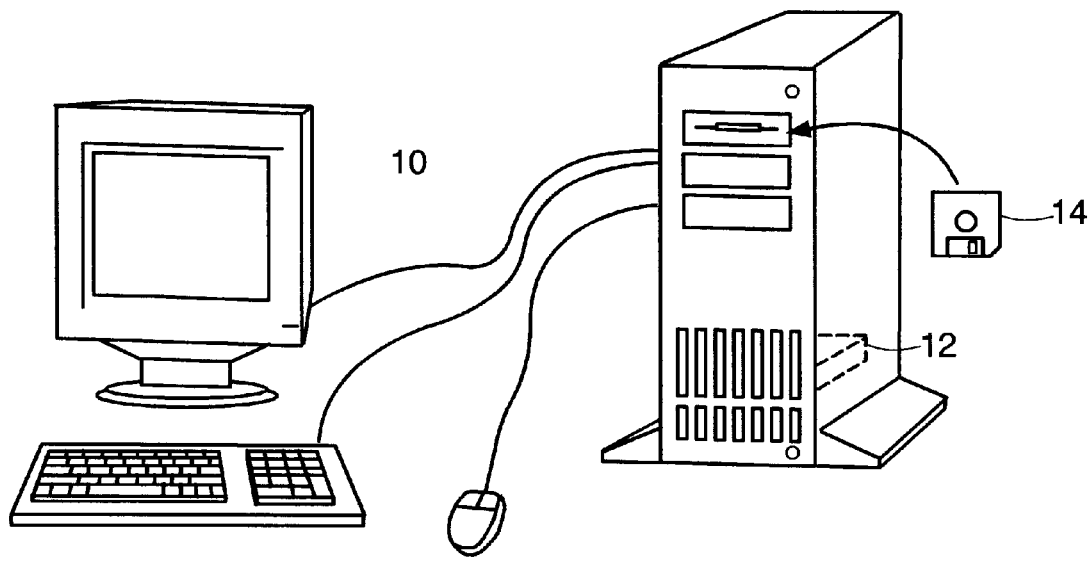
FIG. 1 illustrates a computer on which the present invention may be practiced.

The methods of the present invention may be carried out on a computer 10 of the type illustrated in FIG. 1. It is anticipated that the methods of the present invention will be embodied in software and conventionally stored such as on the computer's hard drive 12, a floppy disk 14, or other storage medium. When the computer 10 executes software which embodies the methods of the present invention, the computer 10 becomes the means necessary for performing the various steps of the method.

Using Bayes rule, HMM emission probabilities can be expressed in terms of posterior state probabilities. This is attractive, because it leads to maximum a-posteriori (MAP) instead of standard maximum likelihood (ML) training. According to this setting, scaled likelihoods can be computed from posterior state probabilities by dividing by priors, which are estimated by relative frequencies.

Let S be a set of HMM states $s_k$. Here, HMM states means a set of tied or related HMM states, typically clustered by means of phonetic decision trees. If we have a method which gives us a reasonable partition of such a set S into M disjoint and non-empty subsets $S_i$, then a particular state $s_k$ will now be a member of S and exactly one of the subsets $S_i$. Therefore, we can rewrite the posterior probability of state $s_k$ as a joint probability of state and appropriate subset $S_i$ and factor it according to $$P(s_k \mid x) = p(s_k, S_i \mid x) \text{ with } s_k \in S_i$$

$$= p(S_i \mid x) p(s_k \mid S_i, x)$$

Figure 2:
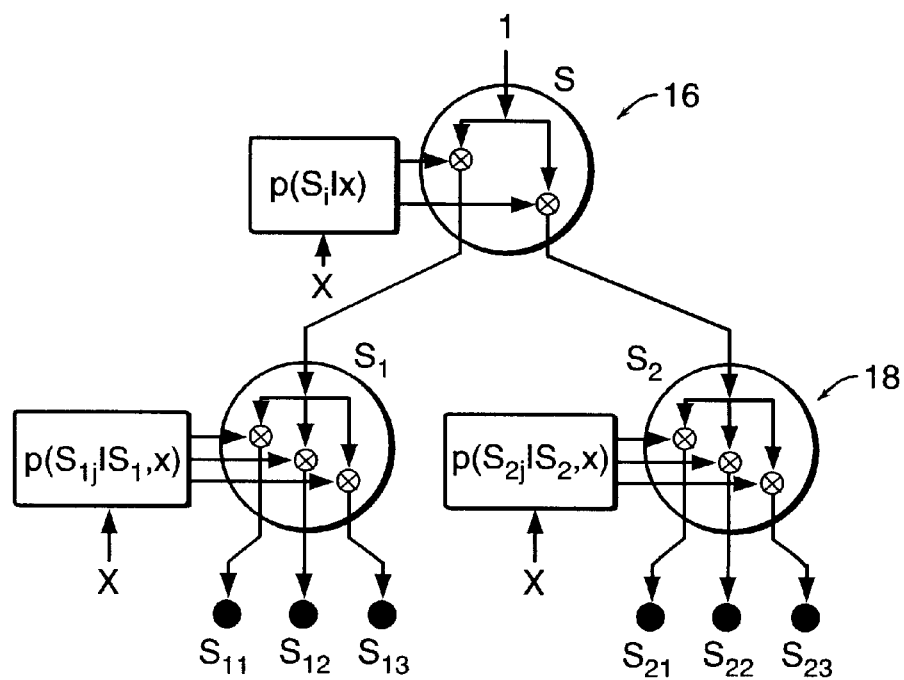
FIG. 2 illustrates the tree structure of a hierarchical decomposition of posteriors.

Thus, the global task of discriminating between all the states in S has been converted into (1) discriminating between subsets $S_i$ and (2) independently discriminating between the states $s_k$ contained within each of the subsets $S_i$. Automatically repeating this process yields a hierarchical tree-organized structure of the type shown in FIG. 2. Each iteration of the clustering generates another level, e.g. levels 16 and 18, of the tree. The clustering may be carried out until a desired level of particularity is obtained. Each level of the model thus contains information about similarity of acoustic units moving from a course to a fine scale. That, for example, can be exploited in efforts to speed up the recognition process. The structure of FIG. 2 may be interpreted as a probability mass distribution device. J. Schürmann and W. Doster, "A Decision Theoretic Approach to Hierarchical Classifier Design", *Pattern Recognition* 17 (3), 1984.

At the root node, an initial probability mass of 1 is fed into the architecture. At each node, the incoming probability mass is multiplied by the conditional posterior probabilities and fed into the children nodes. Eventually, the probability mass is distributed among all the leaves (states) rendering their posterior probabilities. In contrast, typical hierarchical classifiers such as classification trees operate as hard switching devices, allowing only a single path from root node to one of the leaves, depending on the outcome of categorical questions in internal nodes.

Because perfect estimation of (conditional) posterior probabilities cannot be achieved in practice, the proposed hierarchical decomposition depends on the method used to design the tree structure. In our preferred embodiment, we prefer not to adopt phonetic decision trees for several reasons: (1) In most cases, separate decision trees are used to independently cluster context classes for each monophone, and (2) phonetic decision trees often are highly unbalanced. Therefore, an unconstrained clustering algorithm that allows formation of tree structured hierarchies across phone identities is applied. Furthermore, our approach implicitly pursues uniform prior distributions in each node and therefore avoids unbalanced splits which could lead to poorly approximated conditional posteriors.

When dealing with a rather large number of classes, several thousands in the case of an acoustic model, evaluation of all possible configurations for a hierarchical decomposition of the posterior class probabilities becomes intractable. Also, common heuristic top-down approaches based on examination of the class confusion matrix of pre-trained monolithic classifiers are problematic. An agglomerative (bottom-up) clustering scheme using the symmetric information divergence as a measure of acoustic dissimilarity of subphonetic units is applied. Based on this rather inexpensive distance measure, subphonetic units can be clustered efficiently yielding a suitable hierarchical decomposition of posteriors.

Consider the case of two acoustic classes, $s_i$ and $s_j$ which are to be discriminated. Let $p(x|s_i)$ and $p(x|s_j)$ be the class conditional likelihoods for $s_i$ and $s_j$, respectively. The average symmetric discriminating information or symmetric information divergence between $s_i$ and $s_j$ can then be defined as:

$$d(s_i, s_j) = \int_x (p(x|s_i) - p(x|s_j)) \log \frac{p(x|s_i)}{p(x|s_j)} dx$$

The class-conditional likelihoods may be modeled using single full covariance multivariate Gaussians with mean vectors $\mu_i$ and covariance matrices $\Sigma_i$ as described in J. Fritsch, "ACID/HNN; A Framework for Hierarchical Connectionist Acoustic Modeling", Proceedings of IEEE ASRU Workshop, Santa Barbara, 1997, which is hereby incorporated by reference. The resulting distance measure between clusters of Gaussians $S_k$ and $S_l$ is $$D(S_k, S_l) = \sum_{s_i \in S_k} p(s_i|S_k) \sum_{s_j \in S_l} p(s_j|S_l) d(s_i, s_j)$$

This distance measure is used in the following clustering algorithm:
1. Initialize algorithm with n clusters $S_i$, each containing
   (1) a parametric model of the class-conditional likelihood and
   (2) a count $C_i$, indicating the frequency of class $s_i$ in the training set.
2. Compute within cluster priors $p(s_i|S_k)$ for each cluster $S_k$, using the counts $C_i$
3. Compute the symmetric divergence measure $D(S_k, S_l)$ between all pairs of clusters $S_k$ and $S_l$.
4. Find the pair of clusters with minimum divergence, $S_k^*$ and $S_l^*$
5. Create a new cluster $S=S_k^* \cup S_l^*$ containing all Gaussians of $S_k^*$ and $S_l^*$ plus their respective class counts. The resulting parametric model is a mixture of Gaussians where the mixture coefficients are the class priors
6. Delete clusters $S_k^*$ and $S_l^*$
7. While there are at least 2 clusters remaining, continue with step 2.

Figure 3:
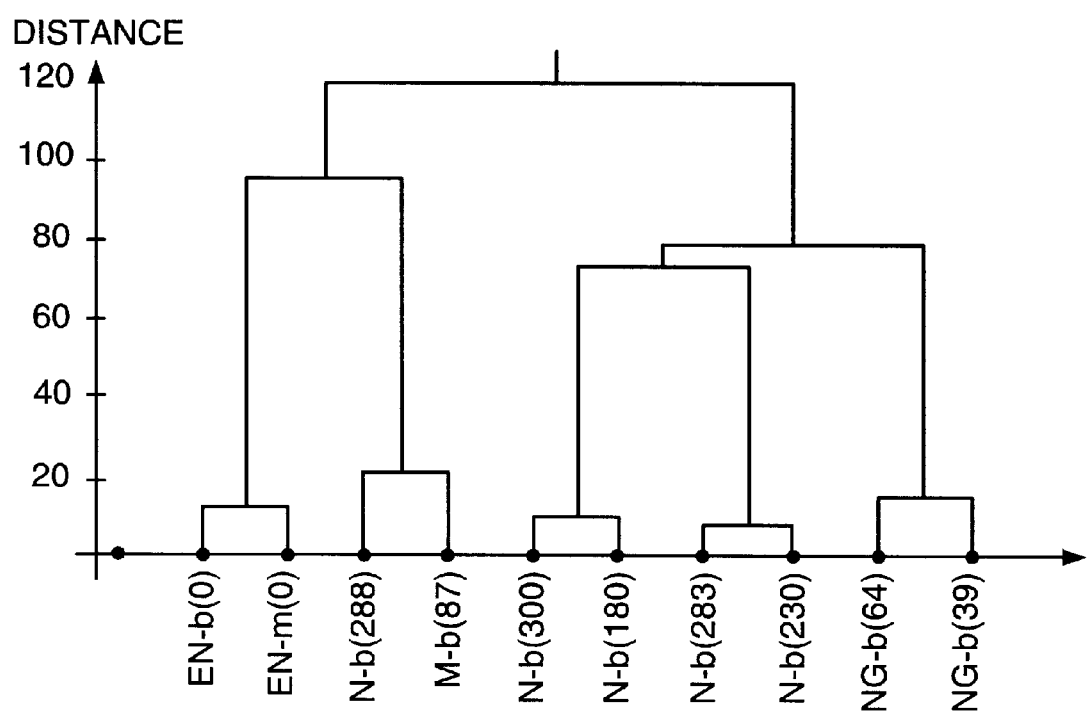
FIG. 3 illustrates a partial dendrogram resulting from the clustering technique of the present invention.

Note that this algorithm clusters HMM sates without knowledge of their phonetic identity but rather solely on acoustic dissimilarity. FIG. 3 illustrates the resulting clustering on a very small subset of initial clusters. The ordinate of the dendrogram plot shows the information divergence at which the merger occurred. Names encode monophone, state (begin, middle, end) and context if (numeric).

Each node in a tree structure produced by such a clustering algorithm represents conditional posteriors when interpreted as a hierarchical decomposition. Estimators such as polynomial regressors, radial basis functions, feed-forward networks, or neural networks may be trained to estimate such posteriors. The complete connectionist acoustic model is called a Hierarchy of Neural Networks (HNN). It may be advantageous to reduce the number of networks in an HNN by applying a greedy, bottom-up, node-merging algorithm as a second step of the clustering process. Using that strategy, the average arity of the HNN tree has been increased from 2 to about 8.

Experiments using such a hierarchical acoustic model are detailed in J. Fritsch, "ACID/HNN: A Framework for Hierarchical Connectionist Acoustic Modeling", Proceedings of IEEE ASUR Workshop, Santa Barbara, 1997. The method of the present invention has enable the construction of competitive connectionist acoustic models for as many as 24,000 allophonic HMM states. Furthermore, the hierarchical structure allows dynamic pruning of the model and supports acoustic adaptation as will be discussed. For a given acoustic feature vector, posterior, prior, and scaled likelihood of an HNN leaf modeling state can be computed incrementally in log space as is demonstrated in Fritsch et al., "Effective Structural Adaptation of LVCSR Systems to Unseen Domains Using Hierarchical Connectionist Acoustic Models", In Proceedings of ICSLP '98, Sydney, Australia, December 1998, which is hereby incorporated by reference.

Because the conditional log posteriors and log priors are all negative, partial posteriors and priors of leaf nodes decrease monotonically when traversing the tree and computing the above sums. This property can, for instance, be exploited in posterior pruning which typically yields significant savings in computational load.

FIGS. 4A, 4B and 4C provide an overview of how the HNN architecture is applied to the estimation of HMM emission probabilities using phonetic decision trees to assign scaled likelihoods at HNN leaves to actual HMM states. FIG. 4D illustrates the instantiation of a node with a neural network.

An interesting property of HNNs that can be exploited for structural adaptation is that partially computed posterior probabilities at all crossed paths in every horizontal cross section of the tree constitute a legal posterior probability distribution over a reduced (merged) set of leaves. A starting point for structural adaptation is an HNN constructed and trained on a domain exhibiting sufficiently rich diversity in phonetic context to provide a basis for any new, unseen domain. To adapt this baseline for any new, smaller domain typically exhibiting very different specificity of phonetic context, the following steps are performed:
1. Take the baseline HNN tree (circles=nodes, squares= leaves) (FIG. 5A)
2. Select nodes that receive more than a predetermined, sufficiently large amount of adaptation data (mincount) and adapt their local estimators of conditional posteriors and priors using adaptation data from the new domain. (FIG. 5B)
3. Remove all nodes that receive less than a predetermined amount of adaptation data. Create new leaf nodes (squares) in place of the root nodes of pruned subtrees. (FIG. 5C)
4. Finally, merge leaf nodes of pruned subtrees. (FIG. 5D) Tie all HMM states corresponding to the leaves of pruned subtrees in the original tree such that they share a single model, represented by the newly created leaves.

Although step 2 appears to operate similar to adaptation techniques such as regression tree based MLLR, its effects are actually quite different due to the possibility and necessity of adapting the priors too, a feature that is unique to connectionist architectures. By adapting the local conditional priors, step 2 already modifies the structure of HNNs implicitly by, for instance, cutting off subtrees whose models could not be observed in the adaptation data. In addition, steps 3 and 4 are used to control the size of the resulting HNN by merging the models with the smallest prior probability in the target domain. Furthermore, computational complexity of model evaluation can be traded off against recognition accuracy. In fact, it turns out that in many cases, one can heavily downsize the HNN tree without losing recognition accuracy.

Experimental results achieved using the disclosed structural adaptation method can be found in Fritsch, "Effective Structural Adaptation of LVCSR Systems to Unseen Domains Using Hierarchical Connectionist Acoustic Models", supra.

In contrast to conventional mixtures of Gaussians based acoustic models, the HNN framework of the present invention does not require additional structures to reduce the complexity of model evaluation. The tree structure itself can be exploited to control the speed-accuracy trade-off. The size of the tree, and hence the degree of accuracy, may be dynamically adapted based on the requirements and data available for a given task. The evaluation of posterior state probabilities follows a path from root node to a specific leaf in the HNN, multiplying all estimates of conditional posteriors along the way. Subtrees can be pruned by closing paths whenever the partial probability falls below a suitable threshold. This can be performed dynamically during speech recognition. This way the evaluation of a significant amount of networks at the bottom of the HNN can be avoided, possibly at the cost of increased error rate.

To achieve robust adaptation to specific speakers on limited data, conventional acoustic models usually require additional structure in the form of regression trees to assign a small set of adaptation transformations to parameters of HMMs as in an MLLR framework. C. J. Leggetter and P. C. Woodland, "Speaker Adaptation of HMMs using Linear Regression", *Tech. Rep. CUED/F-INFENG/TR*181, CUED, Cambridge, England 1994. Such information is readily available in the HNN structure and robust speaker adaptation can be accomplished by simply adapting those networks in the HNN tree that receive enough adaptation data. Individual networks can be adapted by updating weights of either all or some of the layers using error back propagation on Viterbi state alignments. This scheme automatically adjusts to the amount of available adaptation data. In case of very little data, only a few networks in the vicinity of the root node will get updated. The more data that becomes available, the more networks receive enough samples, until eventually all of the networks in the HNN become subject to an update.

The present invention maintains the advantages of discriminative training while circumventing the limitations of standard connectionist acoustic models. Furthermore, HNN acoustic models incorporate the structure for speaker adaptation and scoring speed-up algorithms that usually require additional effort in traditional mixture densities acoustic models. The present invention enables effective adaptation of the structure of a tree-structured hierarchical connectionist acoustic model to unseen new domains. In contrast to existing architectures and adaptation techniques, the present invention not only compensates for mismatches in acoustic space, but adapts to differing specificity of phonetic context in unseen domains by adapting node priors and pruning defective parts of the modeling hierarchy.

While the present invention has been described in connection with a preferred embodiment thereof, those of ordinary skill in the art will recognize that many modifications and variations thereof are possible. For example, the present invention is not limited to the disclosed distance measure. Other measures, as well as other distance measures, may be used. The foregoing disclosure and the following claims are intended to encompass all such modifications and variations.

What is claimed is:

1. A memory device encoded with a computer program for enabling a computer program to execute a method comprised of the steps of:
   initializing a system of clusters, each cluster containing a model of the class-conditional likelihood and a count indicating the frequency of that class in the training set;
   computing within cluster priors for each cluster using the counts;
   computing a divergence measure between all pairs of clusters;
   determining the pair of clusters with a minimum divergence measure;
   creating a new cluster based on the determined pair and deleting the pair having a minimum divergence measure; and
   repeating the process until some predetermined criteria is met.

2. A memory device according to claim 1, wherein each cluster contains at least one hidden Markov model state.

3. A memory device according to claim 1, wherein the divergence measure includes a symmetric information divergence calculation.

4. A memory device according to claim 1, wherein the class conditional likelihood includes a parametric model.

5. A memory device according to claim 4, wherein the parametric model includes a multivariate Gaussian.

6. An apparatus, comprising:
   means for initializing a system of clusters, each cluster containing a model of the class-conditional likelihood and a count indicating the frequency of that class in the training set;
   means for computing within cluster priors for each cluster using the counts;
   means for computing a divergence measure between all pairs of clusters;
   means for determining the pair of clusters with a minimum divergence measure; and
   means for creating a new cluster based on the determined pair and deleting the pair having a minimum divergence measure.

7. An apparatus according to claim 6, wherein each cluster contains at least one hidden Markov model state.

8. An apparatus according to claim 6, wherein the divergence measure includes a symmetric information divergence calculation.

9. An apparatus according to claim 6, wherein the class conditional likelihood includes a parametric model.

10. An apparatus according to claim 9, wherein the parametric model includes a multivariate Gaussian.

11. A method of organizing an acoustic model for speech recognition, comprising:
    initializing a system of clusters, each cluster containing a model of the class-conditional likelihood and a count indicating the frequency of that class in the training set;
    computing within cluster priors for each cluster using the counts;
    computing a divergence measure between all pairs of clusters;
    determining the pair of clusters with a minimum divergence measure;
    creating a new cluster based on the determined pair and deleting the pair having a minimum divergence measure; and repeating the process until some predetermined criteria is met.

12. A method according to claim 11, wherein each cluster contains at least one hidden Markov model state.

13. A method according to claim 11, wherein the divergence measure includes a symmetric information divergence calculation.

14. A method according to claim 11, wherein the class conditional likelihood includes a parametric model.

15. A method according to claim 14, wherein the parametric model includes a multivariate Gaussian.

16. A method of structurally adapting a hierarchical acoustic model having nodes and leaves to a new domain, comprising:

identifying nodes that receive more than a predetermined amount of adaptation data;

adapting the local estimators of conditional posteriors and priors of the identified nodes using data from the new domain;

removing a predetermined number of the non-identified nodes;

creating new leaves where needed to replace the removed nodes; and relating all HMM states corresponding to the new leaves such that they share a single model represented by the new leaves.

17. A method according to claim 16, wherein the hierarchical acoustic model is a connectionist acoustic model.

18. A method according to claim 17, wherein the connectionist acoustic model is a hierarchy of neural networks (HNN).

19. A method according to claim 17, wherein the HNN is based on an agglomerative clustering algorithm.

20. A method according to claim 16, wherein the hierarchical acoustic model is context-dependent.

21. A method according to claim 16, wherein the leaves include HMM states.

22. A method according to claim 16, wherein the nodes include HMM states.

23. A memory device encoded with a computer program for enabling a computer program to execute a method for structurally adapting a hierarchical acoustic model having nodes and leaves to a new domain comprised of the steps of:

identifying nodes that receive more than a predetermined amount of adaptation data;

adapting the local estimators of conditional posteriors and priors of the identified nodes using data from the new domain;

removing a predetermined number of the non-identified nodes;

creating new leaves where needed to replace the removed nodes; and relating all HMM states corresponding to the new leaves such that they share a single model represented by the new leaves.

24. A memory device according to claim 23, wherein the hierarchical acoustic model is a connectionist acoustic model.

25. A memory device according to claim 24, wherein the connectionist acoustic model is a hierarchy of neural networks (HNN).

26. A memory device according to claim 25, wherein the HNN is based on an agglomerative clustering algorithm.

27. A memory device according to claim 23, wherein the hierarchical acoustic model is context-dependent.

28. A memory device according to claim 23, wherein the leaves include HMM states.

29. A memory device according to claim 23, wherein the nodes include HMM states.

30. An apparatus for structurally adapting a hierarchical acoustic model having nodes and leaves to a new domain, comprising:

means for identifying nodes that receive more than a predetermined amount of adaptation data;

means for adapting the local estimators of conditional posteriors and priors of the identified nodes using data from the new domain;

means for removing a predetermined number of the non-identified nodes;

means for creating new leaves where needed to replace the removed nodes; and means for relating all HMM states corresponding to the new leaves such that they share a single model represented by the new leaves.

31. An apparatus according to claim 30, wherein the hierarchical acoustic model is a connectionist acoustic model.

32. An apparatus according to claim 31, wherein the connectionist acoustic model is a hierarchy of neural networks (HNN).

33. An apparatus according to claim 32, wherein the HNN is based on an agglomerative clustering algorithm.

34. An apparatus according to claim 30, wherein the hierarchical acoustic model is context-dependent.

35. An apparatus according to claim 30, wherein the leaves include HMM states.

36. An apparatus according to claim 30, wherein the nodes include HMM states.

* * * * *